United States Patent
Telfer et al.

(10) Patent No.: US 11,316,693 B2
(45) Date of Patent: Apr. 26, 2022

(54) TRUSTED PLATFORM MODULE-BASED PREPAID ACCESS TOKEN FOR COMMERCIAL IOT ONLINE SERVICES

(71) Applicant: Microsoft Technology Licensing, LLC, Redmond, WA (US)

(72) Inventors: Brian Clifford Telfer, Seattle, WA (US); Stefan Thom, Snohomish, WA (US); Torsten Stein, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 192 days.

(21) Appl. No.: 15/979,152

(22) Filed: May 14, 2018

(65) Prior Publication Data

US 2019/0319843 A1 Oct. 17, 2019

Related U.S. Application Data

(60) Provisional application No. 62/657,521, filed on Apr. 13, 2018.

(51) Int. Cl.
*H04L 9/32* (2006.01)
*H04L 12/24* (2006.01)
(Continued)

(52) U.S. Cl.
CPC .......... *H04L 9/3234* (2013.01); *H04L 9/3213* (2013.01); *H04L 41/0806* (2013.01);
(Continued)

(58) Field of Classification Search
CPC ..... H04L 9/3213; H04L 9/3234; H04L 63/10; H04L 41/0893; H04L 41/0806;
(Continued)

(56) References Cited

U.S. PATENT DOCUMENTS 8,881,257 B2 * 11/2014 Cha ................. G06F 21/57
726/10
9,292,711 B1 * 3/2016 Roth ................. G06F 21/71
(Continued)

OTHER PUBLICATIONS

Sarmenta, et al. (2006). Virtual Monotonic Counters and Count-Limited Objects using a TPM without a Trusted OS. STC'06, Nov. 3, 2006, Alexandria, Virginia, USA. (Year: 2006).*
(Continued)

*Primary Examiner* — Jeremy S Duffield
(74) *Attorney, Agent, or Firm* — Mark K. Young; Mayer & Williams, PC

(57) ABSTRACT

A provisioning service operating on a remote server is configured to handle provisioning of Internet of Things (IoT) devices, in which IoT devices are configured to execute policies provided by the provisioning service to self-regulate access to an IoT portal. The provisioning service generates an access token and policy which are unique to a trusted platform module (TPM) for a respective IoT device. The TPM executes the policy upon each instance in which the IoT device requires authorization to perform an operation or access the IoT portal. The policy may be configured according to a prepaid or postpaid model. In both models a local counter within the TPM of the IoT device may increment upon each instance of authorization. Under the prepaid model the IoT device may acquire a set number of uses, and under the postpaid model a statement may be generated based on prior usage.

20 Claims, 14 Drawing Sheets

(51) Int. Cl.
  *H04L 29/06* (2006.01)
  *H04L 41/0806* (2022.01)
  *H04L 41/0893* (2022.01)
(52) U.S. Cl.
  CPC .......... *H04L 41/0893* (2013.01); *H04L 63/10* (2013.01); *H04L 63/20* (2013.01)
(58) Field of Classification Search
  CPC ....... H04L 9/0897; H04L 63/20; H04N 7/162; H04W 4/60; G06Q 20/3674; G06F 21/53; G06F 21/57; G06F 21/572; G06F 21/62
  See application file for complete search history.

(56) References Cited

U.S. PATENT DOCUMENTS

| | | | | |
|---|---|---|---|---|
| 9,825,945 B2* | 11/2017 | Adam | | G06F 21/6281 |
| 2001/0049667 A1* | 12/2001 | Moribatake | | G06Q 20/367 |
| | | | | 705/69 |
| 2003/0105954 A1* | 6/2003 | Immonen | | G06Q 20/1235 |
| | | | | 713/156 |
| 2004/0125397 A1* | 7/2004 | Adkins | | G06Q 30/06 |
| | | | | 358/1.14 |
| 2005/0165693 A1* | 7/2005 | Moritzen | | G06Q 30/00 |
| | | | | 705/59 |
| 2006/0137022 A1* | 6/2006 | Kilian-Kehr | | G06F 21/10 |
| | | | | 726/27 |
| 2006/0236369 A1* | 10/2006 | Covington | | G06F 21/57 |
| | | | | 726/1 |
| 2006/0242069 A1* | 10/2006 | Peterka | | G06F 21/10 |
| | | | | 705/50 |
| 2006/0282899 A1* | 12/2006 | Raciborski | | G06F 21/57 |
| | | | | 726/26 |
| 2007/0050635 A1* | 3/2007 | Popp | | H04L 9/3242 |
| | | | | 713/185 |
| 2008/0022412 A1 | 1/2008 | Challener et al. | | |
| 2008/0052518 A1* | 2/2008 | Newton | | H04L 63/0823 |
| | | | | 713/176 |
| 2008/0083025 A1* | 4/2008 | Meijer | | H04L 63/0807 |
| | | | | 726/9 |
| 2008/0319779 A1* | 12/2008 | Hughes | | G06Q 30/06 |
| | | | | 705/310 |
| 2009/0178138 A1* | 7/2009 | Weiss | | H04L 63/1433 |
| | | | | 726/22 |
| 2009/0292919 A1* | 11/2009 | England | | H04L 9/3271 |
| | | | | 713/168 |
| 2011/0035577 A1* | 2/2011 | Lin | | G06F 21/57 |
| | | | | 713/150 |
| 2011/0167503 A1* | 7/2011 | Horal | | G06F 21/10 |
| | | | | 726/33 |
| 2011/0191859 A1* | 8/2011 | Naslund | | H04N 21/8355 |
| | | | | 726/27 |
| 2012/0179588 A1* | 7/2012 | Gutowitz | | G06Q 20/127 |
| | | | | 705/34 |
| 2012/0304311 A1 | 11/2012 | Kline et al. | | |
| 2013/0339729 A1* | 12/2013 | Novak | | G06F 21/602 |
| | | | | 713/167 |
| 2014/0137178 A1* | 5/2014 | Thom | | G06F 21/6218 |
| | | | | 726/1 |
| 2014/0173695 A1* | 6/2014 | Valdivia | | G06F 21/33 |
| | | | | 726/4 |
| 2014/0298016 A1* | 10/2014 | Ekberg | | H04L 9/14 |
| | | | | 713/168 |
| 2015/0178724 A1* | 6/2015 | Ngo | | G06Q 20/32 |
| | | | | 705/71 |
| 2015/0180863 A1* | 6/2015 | Kobayashi | | H04L 47/70 |
| | | | | 726/9 |
| 2015/0339664 A1* | 11/2015 | Wong | | H04W 12/06 |
| | | | | 705/71 |
| 2016/0259941 A1* | 9/2016 | Vasudevan | | G06F 21/572 |
| 2016/0364553 A1* | 12/2016 | Smith | | H04W 12/04033 |
| 2017/0140130 A1 | 5/2017 | Thom et al. | | |
| 2017/0141926 A1* | 5/2017 | Xu | | H04L 9/3263 |
| 2017/0302459 A1 | 10/2017 | Fenner et al. | | |
| 2018/0018288 A1* | 1/2018 | Dewan | | G06F 3/0637 |
| 2018/0020101 A1* | 1/2018 | Chan | | H04M 15/83 |
| 2018/0300471 A1* | 10/2018 | Jain | | G06F 21/6218 |

OTHER PUBLICATIONS

Trusted Computing Group. (2007). TPM Main Part 1 Design Principles Specification, Version 1.2, Level 2, Revision 103. Jul. 9, 2007. https://trustedcomputinggroup.org/wp-content/uploads/mainP1DPrev103.pdf (Year: 2007).*

Turner, J. (2017). TPM Key Attestation. Microsoft. https://docs.microsoft.com/en-us/windows-server/identity/ad-ds/manage/component-updates/tpm-key-attestation (Year: 2017).*

Guette, G. and Bryce, C. 2008. Using TPMs to Secure Vehicular Ad-Hoc Networks (VANETs). In: Onieva, J.A., Sauveron, D., CHaumette, S., Gollmann, D. and Markantonakis, K. ed(s). Information Security Theory and Practices. Germany: Springer, pp. 106-116. (Year: 2008).*

Trusted Computing Group (TCG). 2013. "Endorsement Key (EK) and Platform Certificate Enrollment Specification Frequently Asked Questions". https://trustedcomputinggroup.org/wp-content/uploads/IWG-EK-CMC-enrollment-for-TPM-v1-2-FAQ-rev-April-3-2013.pdf (Year: 2013).*

Ng, R. 2008. "Trusted Platform Module: TPM Fundamentals". Infineon Technologies Asia Pacific Pte Ltd. http://www.cs.unh.edu/~it666/reading_list/Hardware/tpm_fundamentals.pdf (Year: 2008).*

"TCG Infrastructure Working Group A CMC Profile for AIK Certificate Enrollment", Retrieved Form http://www.trustedcomputing-group.org/wp-content/uploads/IWG_CMC_Profile_Cert_Enrollment_v1_r7.pdf, Mar. 24, 2011, 72 Pages.

"International Search Report and Written Opinion Issued in PCT Application No. PCT/US2019/024448", dated Aug. 20, 2019, 19 Pages.

* cited by examiner

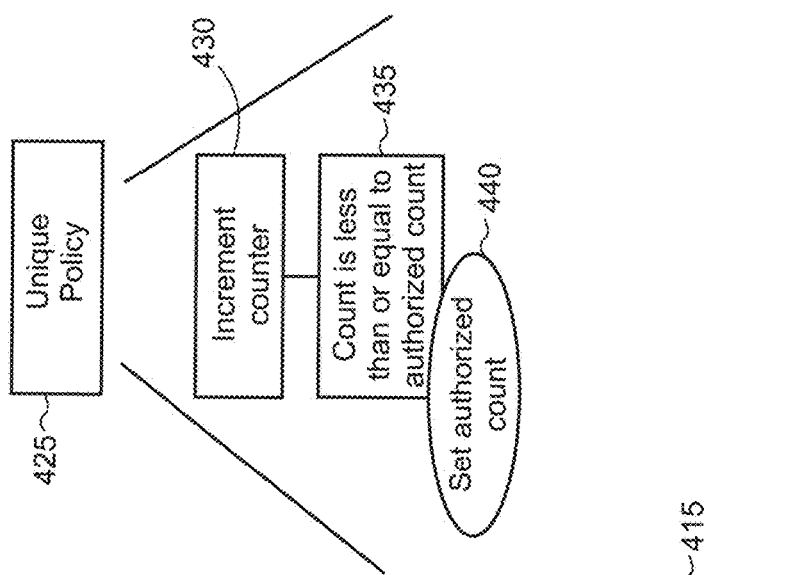
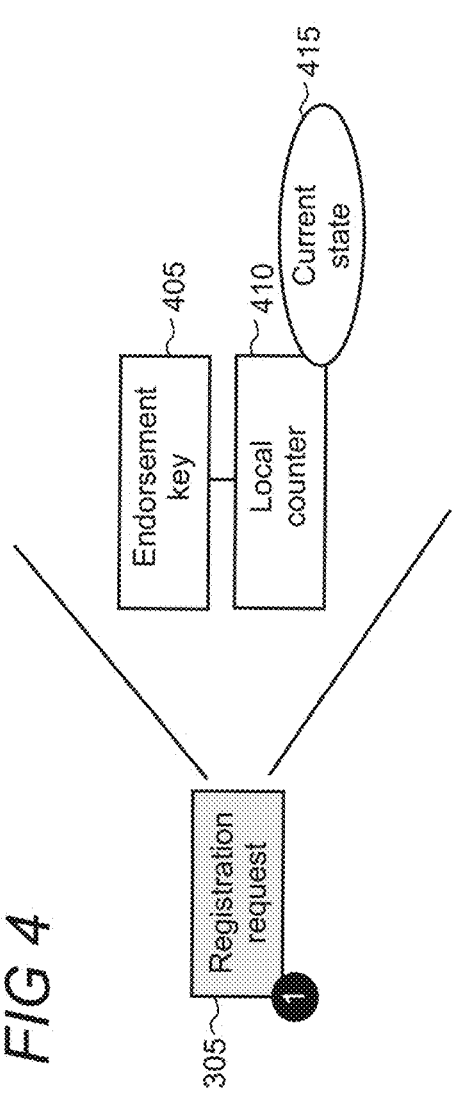
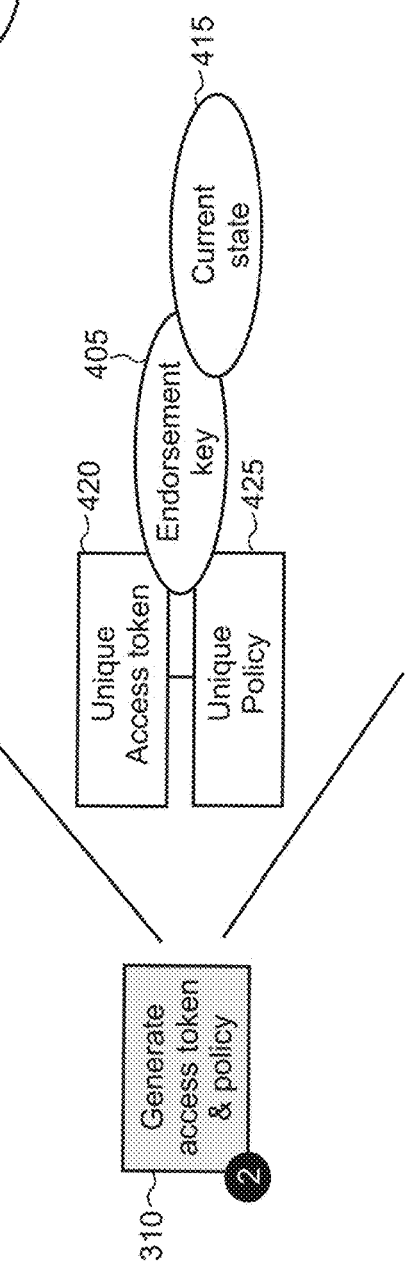

1600

1700

1900

TRUSTED PLATFORM MODULE-BASED PREPAID ACCESS TOKEN FOR COMMERCIAL IOT ONLINE SERVICES

CROSS-REFERENCE TO RELATED APPLICATIONS

This application claims benefit and priority to U.S. Provisional Application Ser. No. 62/657,521 filed Apr. 13, 2018, entitled "Trusted Platform Module-Based Prepaid Access Token for Commercial IoT Online Services," the disclosure of which is incorporated herein by reference in its entirety.

BACKGROUND

The Internet of Things (IoT) connects devices having various types, sizes, and functions over a network. The devices (or "things") in the IoT can be a location tag, a connected thermostat, a monitoring camera, a sensor device, an industrial machine, or anything that can communicate data over a network connection. IoT devices typically have a way to connect to the Internet to report data to other devices and/or services and request/receive information from other devices. Devices may connect to the Internet in many different ways, such as through a fixed WI-FI connection, a wired connection, a BLUETOOTH connection, a direct wireless network connection (e.g., 3G, 4G or 5G standards), or a proprietary connection to a wireless network.

SUMMARY

A provisioning service configured on a remote server is adapted to provide access tokens and policies to local computing devices, such as Internet of Things (IoT) devices, in which an IoT device executes a policy using a hardware-based trusted platform module (TPM) to authorize one or more operations (such as executing an application and/or accessing an IoT portal) to interact with a service, database, or other resource. The provisioning service generates access tokens and policies that are unique to each TPM that are disposed in respective IoT devices. The policy includes one or more elements (e.g., rules) which the IoT device satisfies to thereby utilize the access token to authorize the operation. Policy elements can include a rule for a local counter associated with an IoT device to increment by a set value after each attempted use of the access token, and a rule that the counter be less than or equal in value to a pre-set authorization counter written into the policy. If one or both policy elements are not satisfied, the IoT device will be unable to use the access token to authorize a given operation or access a service portal.

The IoT device may submit a request to the provisioning service for the access token to access the IoT portal. The request may include a current state of the IoT device's local counter (e.g., the current count) and a unique endorsement key associated with the device's TPM. The provisioning service verifies the identity of the IoT device, for example, by communicating with the IoT portal to confirm that the IoT device exists in its database or is otherwise a trusted device. After verifying the IoT device's identity, the provisioning service generates a unique access token, or authentication key, for the IoT device. The access token may be generated using the unique endorsement key. The provisioning service also generates and associates a policy with the access token, whereby each element included in the policy needs to be met for the TPM to utilize the access token to authorize a given IoT device operation.

The generated access token is stored in the TPM of the IoT device. When the IoT device attempts to perform an operation that requires authorization by the access token, the device's TPM executes the elements of the associated policy. For example, the TPM may increase the local counter and verify that the incremented local counter is less than or equal to a pre-set authorization counter included in the policy. The provisioning service generates the policy for a respective IoT device, based on a known current state of that device's local counter. The counter state may have been transmitted to the provisioning service in an IoT device registration process or when a device sought to obtain additional credits to access the IoT portal. Thus, the authorization counter included in the policy is unique to the IoT device and is based on the number of uses purchased, for example, by an IoT device owner or administrator. The unique policy is used to enforce and verify the IoT device's authorization to perform certain operations, such as accessing the IoT portal.

The counter is incremented each time the IoT device executes the policy to use the access token. When the counter increases beyond the pre-set authorization counter included in the policy, the TPM prohibits further use of the access token (e.g., device access to the IoT portal may be denied). When the IoT device is not in compliance with the policy, a user may submit a request to the provisioning service to modify the policy for additional use. The access token may still be operational even though the policy is stale, but the TPM will not authorize use of the access token because one or more elements in the policy were not satisfied.

The implementation of the access token and policy advantageously creates a prepaid model for IoT devices to access the IoT portal and/or perform other operations. Enforcement of the model is performed locally at the IoT device by the TPM preventing use of the access token when one or more elements in the policy are not satisfied. Enforcement mechanisms can be implemented as an additional software layer over the existing TPM hardware to effectively enforce authorization for IoT device operations and access to the IoT portal in accordance with the policy. The access token and policy in the prepaid model provides increased security and trust for interactions between the IoT device and remote services to thereby reduce opportunities for bad actors to bypass policy enforcement. The local enforcement mechanisms on the IoT device can also supplement existing authorization procedures that are implemented by the IoT portal, provisioning service, or both. Such comprehensive approach can enhance the overall integrity of the model by implementing policy enforcement mechanisms and security across each operational component.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIGS. 4-8 show illustrative objects, transmissions, and processes associated with the various steps depicted in FIG. 3;

Like reference numerals indicate like elements in the drawings. Elements are not drawn to scale unless otherwise indicated.

DETAILED DESCRIPTION

Figure 1:
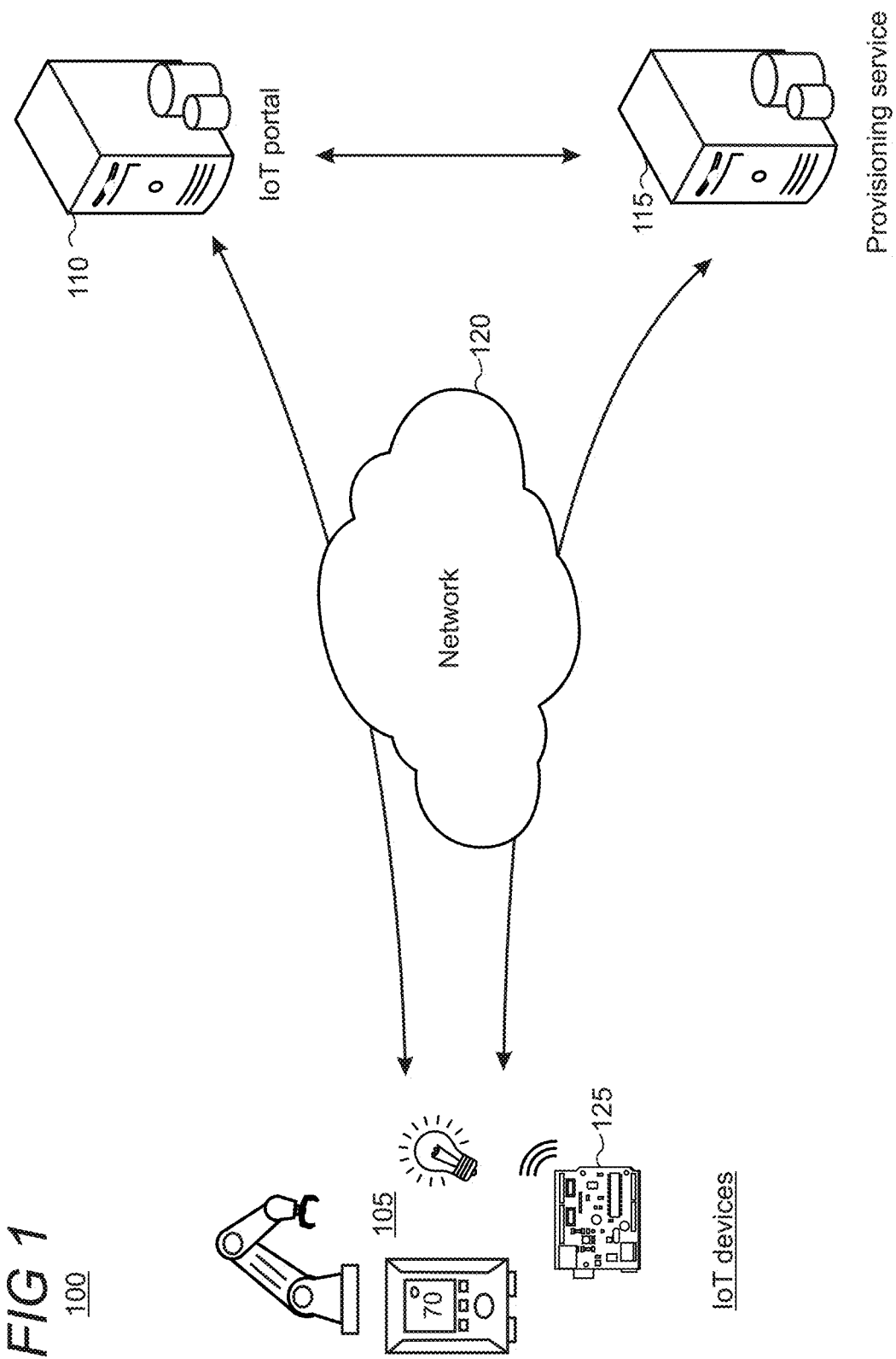
FIG. 1 shows an illustrative environment of Internet of Things (IoT) devices communicating with an IoT portal and provisioning service.

FIG. 1 shows an illustrative environment 100 in which a number of Internet of Things (IoT) devices 105 are configured to communicate over a network 120 with an IoT portal 110 and provisioning service 115, which operate on respective remote servers. The network can include any of one or more networks including, for example, personal area networks, local area networks, wide area networks, the Internet, and the world wide web.

IoT devices may interconnect and/or communicate over various networks, and typically utilize one or more sensors to gather pertinent data useful to a particular device. IoT devices can utilize various sensors, actuators, software, network connectivity, and connections to a remote server or edge compute unit to thereby facilitate and establish comprehensive knowledge, understanding, or insight into a component or its environment. As illustratively shown in FIG. 1, exemplary IoT devices 105 can include commercial machinery like a crane, or household items such as a light bulb, thermostat, and the like. However, these devices are only illustrative as the number, variety, and/or type of objects or components which can be configured as an IoT device are virtually unlimited. An exemplary motherboard which may include a System on a Chip (SoC) configuration 125 is also illustratively shown that can implement an IoT device or enable transition of a device, component, or object into an IoT-configured device.

Figure 2:
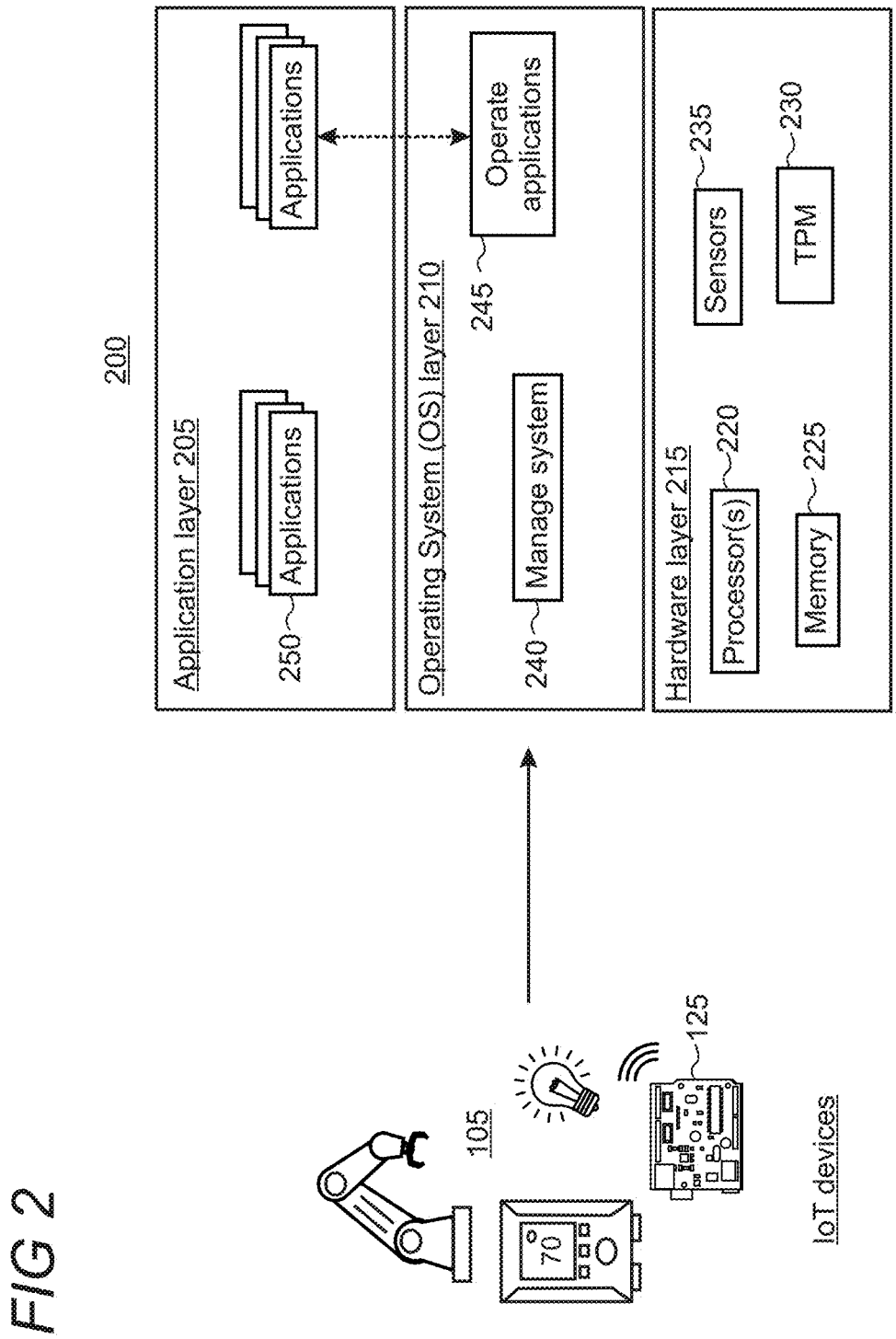
FIG. 2 shows an illustrative architecture of an IoT device.

FIG. 2 shows an illustrative system architecture 200 for an IoT device 105. The architecture is arranged in layers and includes a hardware layer 215, an operating system (OS) layer 210, and an application layer 205. The hardware layer 215 provides an abstraction of the various hardware used by the IoT device 105 to the layers above it. In this illustrative example, the hardware layer supports one or more processors 220, memory 225, a trusted platform module (TPM) 230, sensors 235 (e.g., temperature sensors, pressure sensors, motion sensors), and input/output devices or user interfaces such as buttons, displays, etc. (not shown).

The TPM may be implemented using a specialized hardware chip that is configured to provide hardware authentication for the IoT device 105. The TPM is utilized to increase device integrity and security by enabling verification that the IoT device performs as intended. The TPM utilizes an endorsement key which is unique to the TPM and IoT device, which is kept private and secure in the TPM. For example, the IoT portal 110 and provisioning service 115 can utilize the endorsement key for device recognition in the present implementation. In other embodiments, the TPM may be implemented using firmware or a combination of hardware and firmware in order to provide the authentication functionalities for the IoT device.

The application layer 205, in this illustrative example, supports various applications 250. Although not shown, the applications can be configured to receive data gathered from one or more sensors, make sense of that data for use, or transmit that data to a remote service, such as the IoT portal 110 (FIG. 1). The IoT portal can use the data for various purposes and/or provide services or expose resources to the device. For example, an exemplary service provides predictive analyses so that system administrators or other users can be proactive to potential problems instead of being reactive. Thus, sensors on a crane can gather data which may indicate a problem with the crane's operations, for example, an administrator can investigate the potential problem instead of waiting for the problem to occur downstream in the process, assembly, etc.

Any number of applications can be utilized by the respective IoT device, whether proprietary or third party applications. The applications can be implemented using locally executing code. However, in some cases applications can rely on services and/or remote code execution provided by remote servers or other computing platforms such as those supported by the IoT portal 110.

The OS layer 210 supports, among other operations, managing the operating system 240 and operating applications 245 as illustratively shown by the arrow. The OS layer may interoperate with the application and hardware layers to perform various functions and features.

Returning to FIG. 1, the IoT portal 110 can provide remote services for IoT devices 105. For example, the IoT portal can provide centralization for data collected by IoT device sensors, and can enable real-time data access for device operators, administrators, and owners using respective computing devices such as a laptop, personal computer (PC), smartphone, tablet computing device, and the like (not shown). The IoT portal can also verify that IoT devices are authorized to use the IoT portal services, for example by confirming the IoT device is properly registered and is up to date on payments for the services.

The provisioning service 115 may be configured to facilitate registration, authorization, and re-authorization processes for respective IoT devices 105 so that the devices can utilize the IoT portal services according to one or more policies, as described below. For example, IoT devices can be subject to subscription-based policies to use the IoT portal's services. These subscription-based services can require an operator or owner of an IoT device to purchase time to access the IoT portal. An exemplary subscription-based service may issue units to a particular IoT device, in which each unit is associated with a set period of time. For example, an owner may purchase 50 units of time, in which each unit is allotted four hours of use. Upon expiration of the 50 units, the owner or operator can purchase additional units from the provisioning service.

Figure 3:
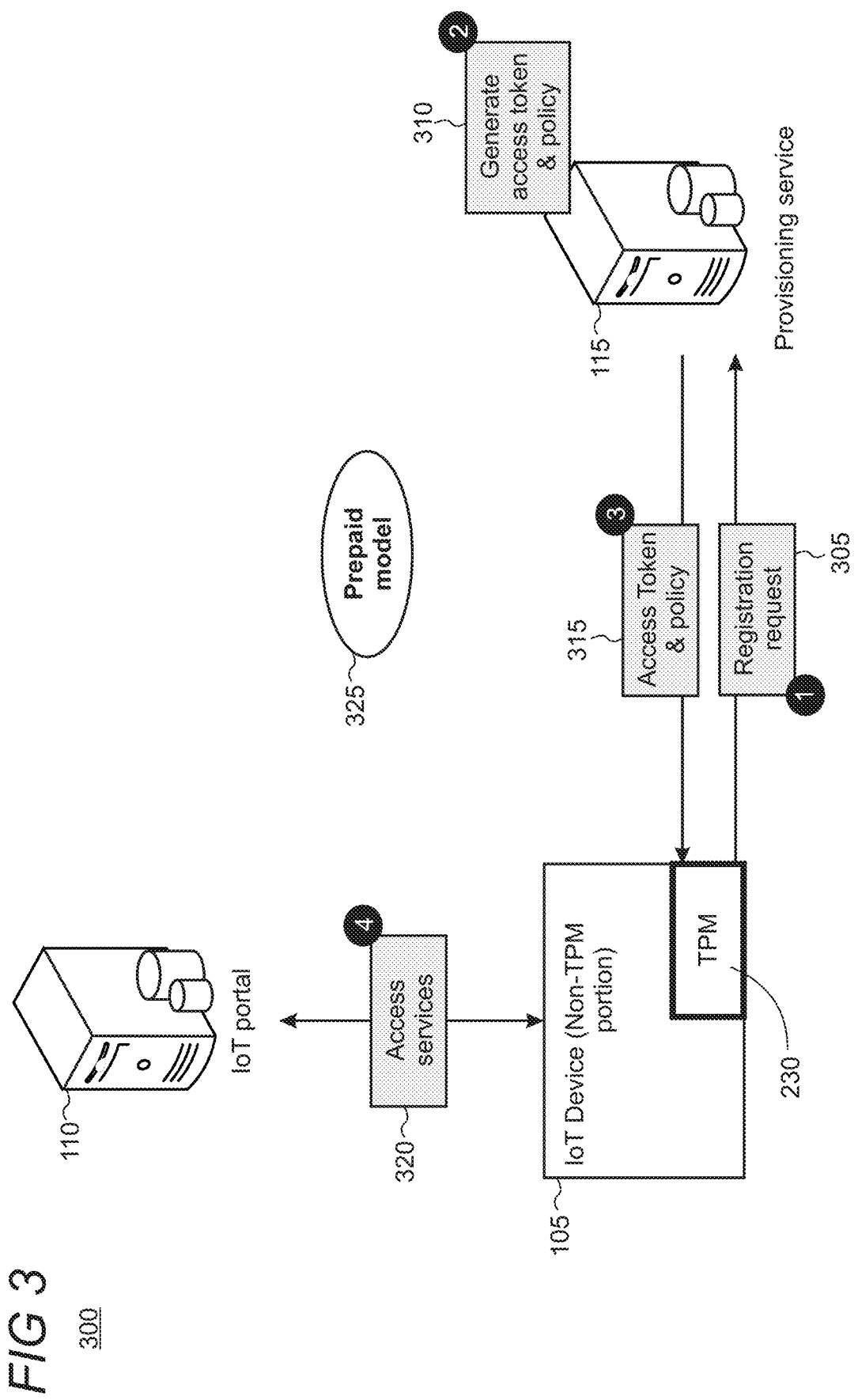
FIG. 3 shows an illustrative environment of a prepaid model for authorization of the IoT device.

FIG. 3 shows an illustrative environment 300 in which the IoT device 105, provisioning service 115, and IoT portal 110 communicate with each other over a network 120 (FIG. 1) according to a prepaid model 325. Thus, for example, the IoT device may perform operations or utilize services offered by the IoT portal after making an up-front payment for the services.

The IoT device may transmit a registration request 305 to the provisioning service 115. As shown in FIG. 4, the registration request may include objects such as an endorsement key 405 and a current state 415 of a local counter 410 for the TPM. As shown in FIG. 3, the IoT device includes a non-TPM portion that is separate from the TPM. The endorsement key and local counter are directly associated with the TPM to thereby make both objects trusted. The provisioning service can use the endorsement key to verify the unique hardware identity for the IoT device because each endorsement key is unique to a particular TPM and its associated IoT device. The local counter can be implemented, for example, as a trusted counter such as a monotonic counter (i.e., one that cannot be reset). The provisioning service may recognize the endorsement key for that device or may alternatively verify its identity with the IoT portal 110.

Using the endorsement key, the provisioning service may generate a unique access token 420 and policy 425 for the IoT device 105, as illustratively represented by numeral 310 in FIGS. 3 and 5. The access token and policy are unique by being respectively generated using the endorsement key 405 (which is unique to the respective IoT device), and the current state 415 (e.g., current count) of the local counter 410.

FIG. 6 shows illustrative elements associated with the unique policy 425, in which the elements include rules to increment a counter 430 and verify that the count is less than or equal to an authorized count 435. The elements may be implemented each time the TPM executes the policy, such as when the IoT device seeks to access the IoT portal. Additional or alternative elements to those which are depicted in FIG. 6 can be included in the policy.

An authorized count may be set 440 within the policy based on the current state of the local counter that was previously transmitted to the provisioning service. Thus, for example, if the current state of the local counter is 60 and the user purchases 40 units of time, then the authorized count may be set to 100 (i.e., 60+40). The user may purchase units of time using a separate computing device, such as a PC (not shown), or may have an account set-up with the provisioning service which automatically charges the user's account upon registration of the IoT device or when the IoT device requests additional units of time.

Figure 7:
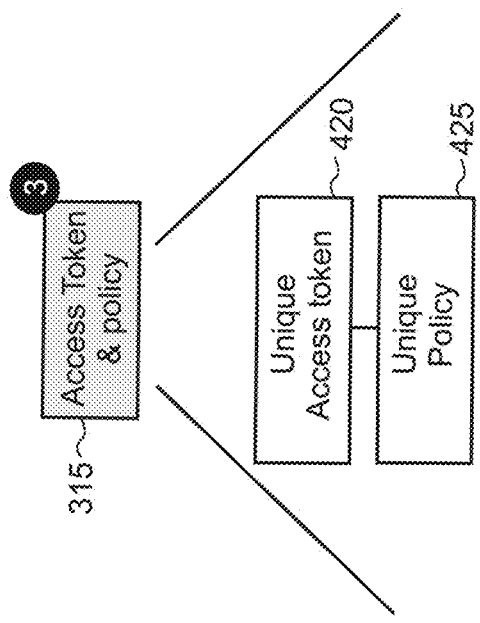

When the access token and policy are generated 310, the provisioning service 115 may transmit objects including the access token and policy to the TPM 230 of the IoT device 105 (as representatively shown at numeral 315 in FIG. 3). As shown in FIG. 7, these transmitted objects include the unique access token 420 and unique policy 425 which were generated by the provisioning service.

Figure 8:
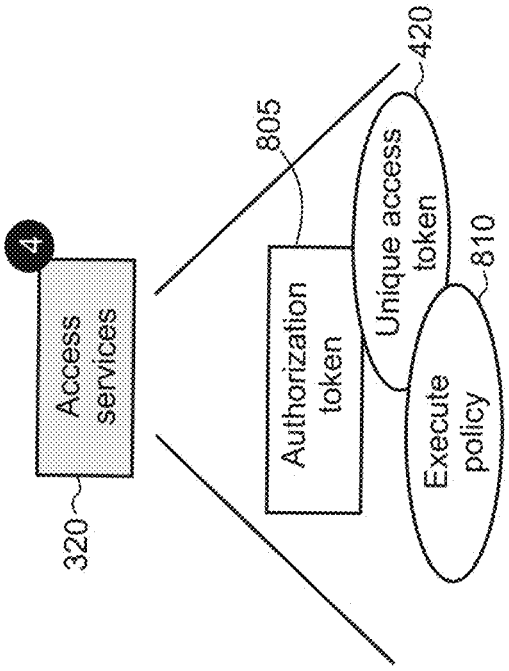

Upon receiving the access token and policy, the IoT device is then authorized to perform various operations, such as using an application or accessing services 320 associated with the IoT portal 110. For example, as illustratively shown in FIG. 8, an authorization token 805 can be signed (i.e., authorized) using the unique access token 420, which is employed at the IoT portal to establish authorized IoT device access to its services. The policy is executed at the TPM, as representatively shown at numeral 810, at each instance upon which authorization is required. Because authorization depends on the TPM's ability to utilize the access token and policy, access to the IoT portal is enforced using procedures and enforcement mechanisms that are local to the IoT device. Thus, enforcement to perform an operation or access the IoT portal is dependent on authorization procedures and regulations that the IoT device performs itself.

Referring back to FIG. 6, the unique policy 425 includes elements which are executed by the TPM. These elements may be executed each time the IoT device uses a unit of time, or alternatively according to another subscription or use model, such as upon each transmission or communication with the IoT portal. Thus, for example, each policy execution can include incrementing the TPM's local counter and verifying that the incremented count is less than or equal to the authorized count. When both policy elements are satisfied, the access token approves and signs the authorization token, which the IoT device can use to perform an operation and/or access the IoT portal. Therefore, the number of authorized uses remaining for the access token is the difference between the current state of the local counter and the set authorized count within the policy.

When one or more elements in the policy are not met, the TPM self-regulates and refuses to authorize the operation or access to the IoT portal by, for example, not signing the authorization token. Thus, for example, the policy may fail when the local counter is greater than the set authorized count 440 within the policy.

Figure 9:
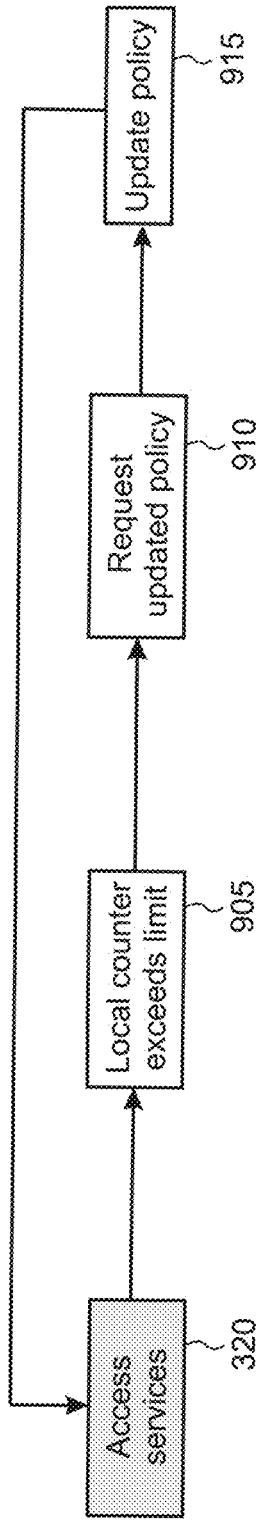
FIG. 9 shows an illustrative process to update a policy for the IoT device.

FIG. 9 shows an illustrative flowchart showing processes which may be performed when one or more of the policy's elements fail at the TPM. For example, in step 320 the IoT device may properly access and use services offered by the IoT portal. In step 905, the local counter on the TPM of the IoT device exceeds its limit, that is, the local counter is greater than the authorized count within the policy.

Unless specifically stated, methods or steps shown and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 910, the IoT device may request an updated policy from the provisioning service, in which the provisioning service sets a new authorized count within a new or amended policy that is greater than the current state of the local counter. The request from the IoT device may include a current state of the TPM's local counter so that the provisioning service can suitably adjust an existing policy or create a new policy. Thus, for example, the new authorized count continues to increase upon each re-authorization and is based on a current or most up-to-date state of the local counter.

In step 915, the provisioning service updates the policy for the TPM of the IoT device by increasing the authorized count. The process in FIG. 9 is repeated each time the IoT device depletes its authorization credits set in the policy. Because the access token is unique to the TPM, the access token is operational and usable even when the policy fails. However, utilization of the access token depends on successful execution of all of the elements within the policy. Thus, use of the access token to access the IoT portal or perform other operations is contingent upon successful execution of the policy.

Figure 10:
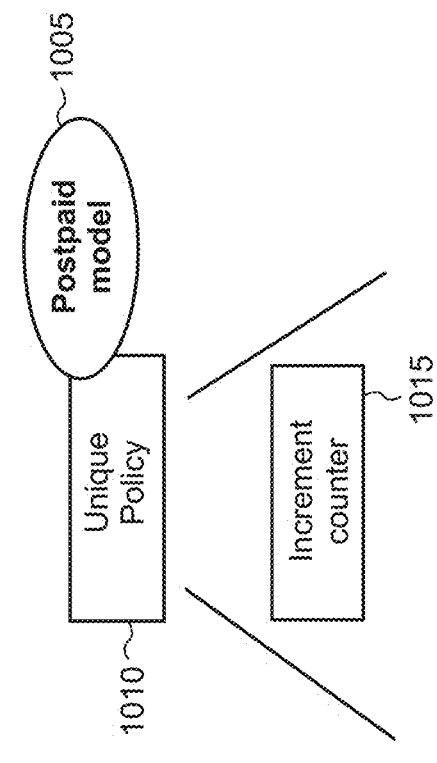
FIG. 10 shows an illustrative policy for a postpaid model.

FIGS. 10-14 show an alternative embodiment using a postpaid model 1005 for IoT devices. FIG. 10 shows an illustrative unique policy 1010 for the postpaid model 1005, in which the unique policy includes the element of incrementing the counter 1015. In contrast to the prepaid model, the postpaid model may not implement the element which verifies the local counter is greater than or equal to the authorized count.

Figure 11:
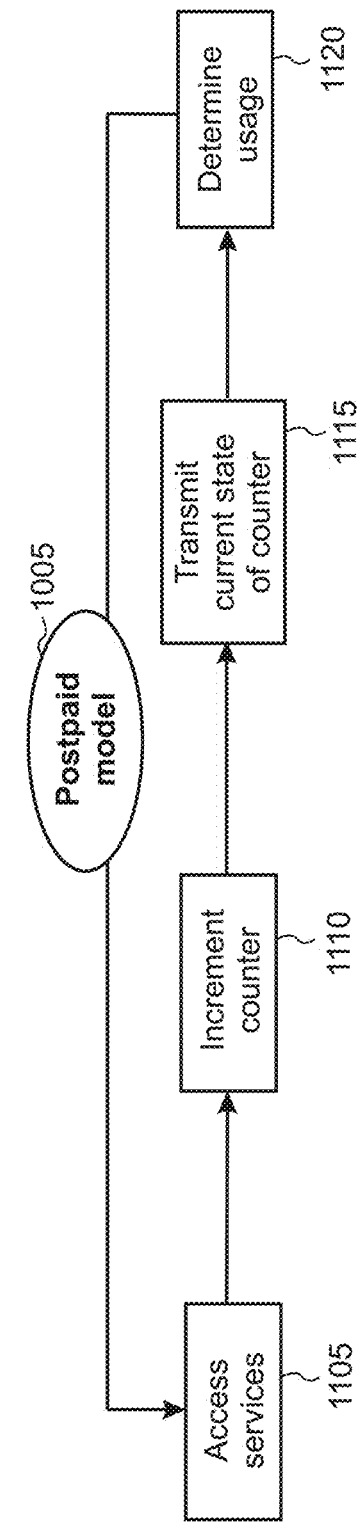
FIG. 11 shows an illustrative process to determine usage for the IoT device according to the postpaid model.

FIG. 11 shows an illustrative flowchart for the postpaid model 1005. In step 1105, the IoT device accesses the services provided by the IoT portal. In step 1110, the TPM on the IoT device increments the counter according to the unique policy 1010. The counter may be incremented according to the implemented subscription policy, such as upon each instance in which a new unit of time is required to access the IoT portal. In step 1115, a current state of the local counter is transmitted to the provisioning service 115. In step 1120, the provisioning service determines usage for the IoT device based on the current state of the local counter. For example, the provisioning service may compare the current state of the local counter to a previous known state of the local counter. The provisioning service can therefore determine the IoT device's usage in terms of, for example, units of time. The provisioning service can subsequently automatically charge an account associated with that IoT device or send a statement of usage for which to receive payment from an owner or operator of the IoT device.

Figure 12:
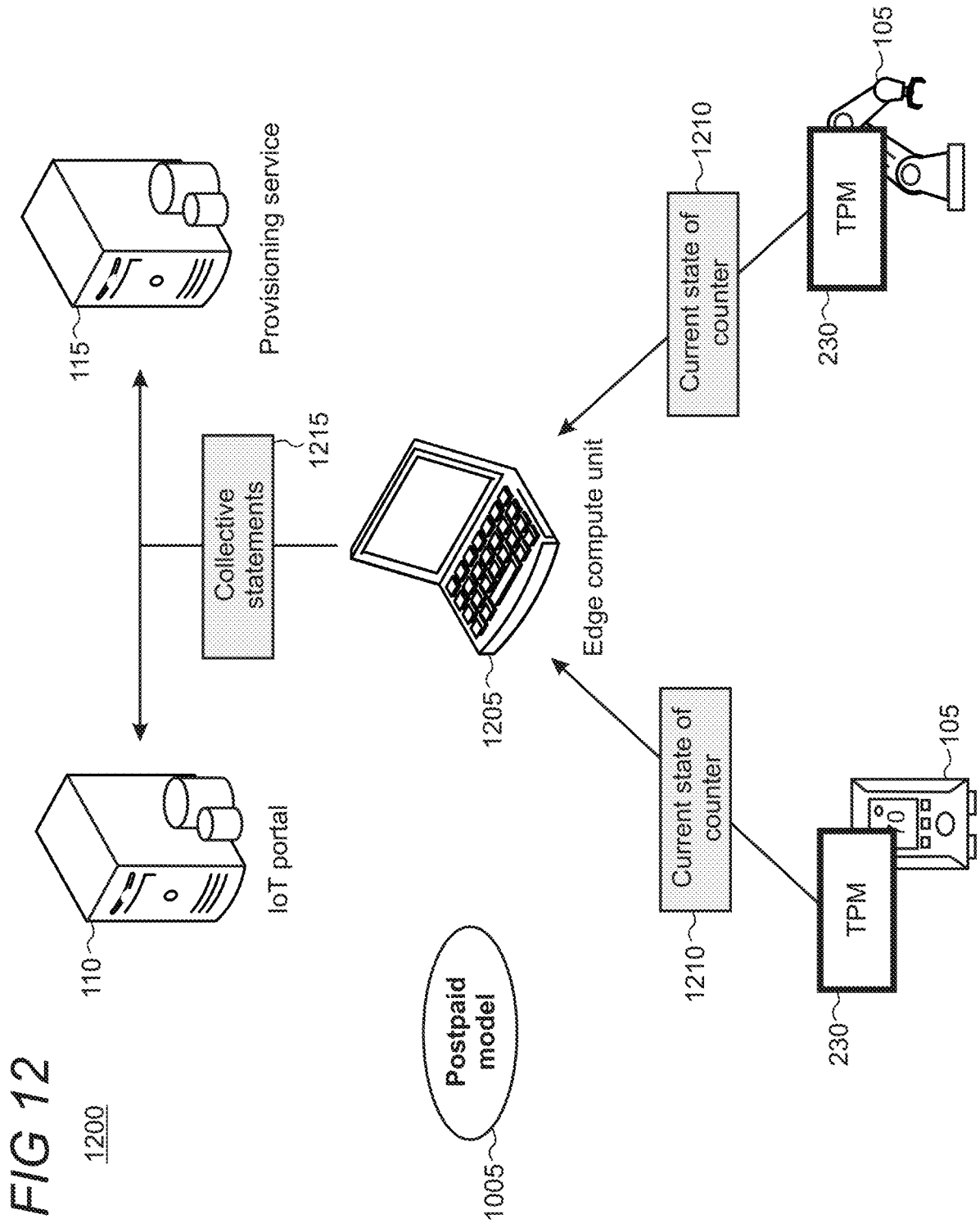
FIG. 12 shows an illustrative environment for a postpaid model which utilizes an edge compute unit.

In another embodiment, FIG. 12 shows an illustrative environment 1200 for a postpaid model 1005 in which an edge compute unit 1205 can be implemented local to the IoT devices 105. In FIG. 12, the edge compute unit is depicted as a laptop computer, but the edge compute unit can be a server or other suitable computing device which can receive and store data from IoT devices. In this example, the TPMs of the respective IoT devices transmit a current state of the respective counters (as illustratively shown by numerals 1210) to the edge compute unit. The edge compute unit may store the counter information for a period of time and then transmit the collective statements 1215 to the provisioning service and/or the IoT portal.

Figure 13:
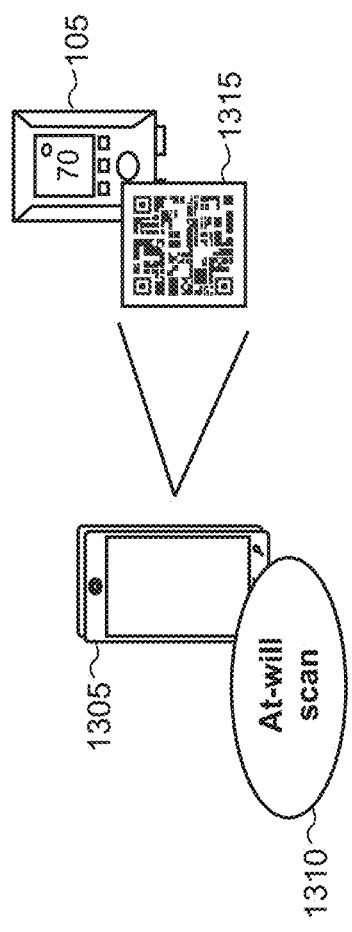
FIG. 13 shows an illustrative usage transmission for the postpaid model.

FIG. 13 shows an illustrative embodiment in which a computing device 1305, such as a smartphone or other handheld computer, can scan a QR (quick response) code 1315 associated with the IoT device. An at-will scan 1310 captures, via the QR code, a current state of the counter for the IoT device, which is then transmitted to the provisioning service. The QR code can reflect the current state of the local counter in the TPM on the IoT device. Because the local counter (e.g., monotonic counter) is considered a trusted component, the postpaid model according to the at-will scan is considered a trustworthy model to charge customers.

Figure 14:
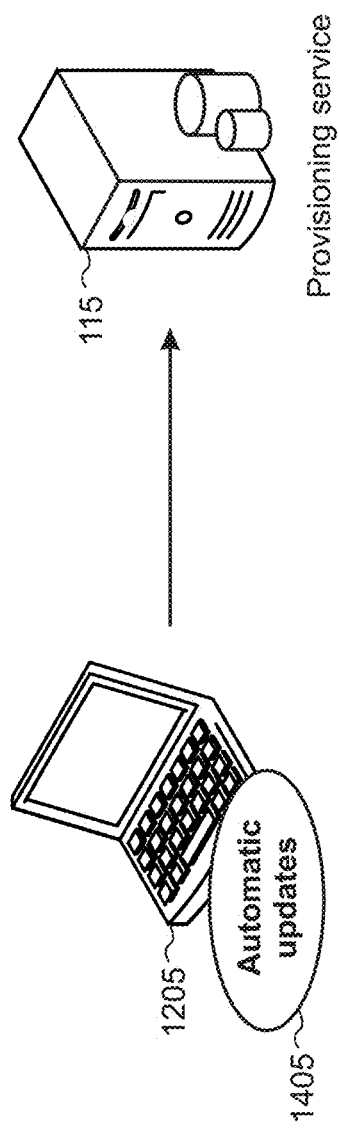
FIG. 14 shows an illustrative environment which utilizes automatic updates according to a postpaid model.

FIG. 14 shows an illustrative embodiment in which the edge compute unit 1205 performs automatic updates to the IoT portal. For example, IoT devices 105 may periodically transmit current states of respective counters to the edge compute unit. The edge compute unit can then periodically transmit automatic updates 1405 for each IoT device to the provisioning service which can prepare a statement for prior known usage for the IoT device.

A hybrid of the configurations shown in FIGS. 13 and 14 can be implemented in an additional embodiment. For example, a handheld or other computing device can obtain a current state of the counter using a scanner. The handheld computing device may store the one or more counter states for each IoT device or transmit the data to the edge compute unit. From there, the edge compute unit can periodically and automatically transmit the data to the provisioning service.

Figure 15:
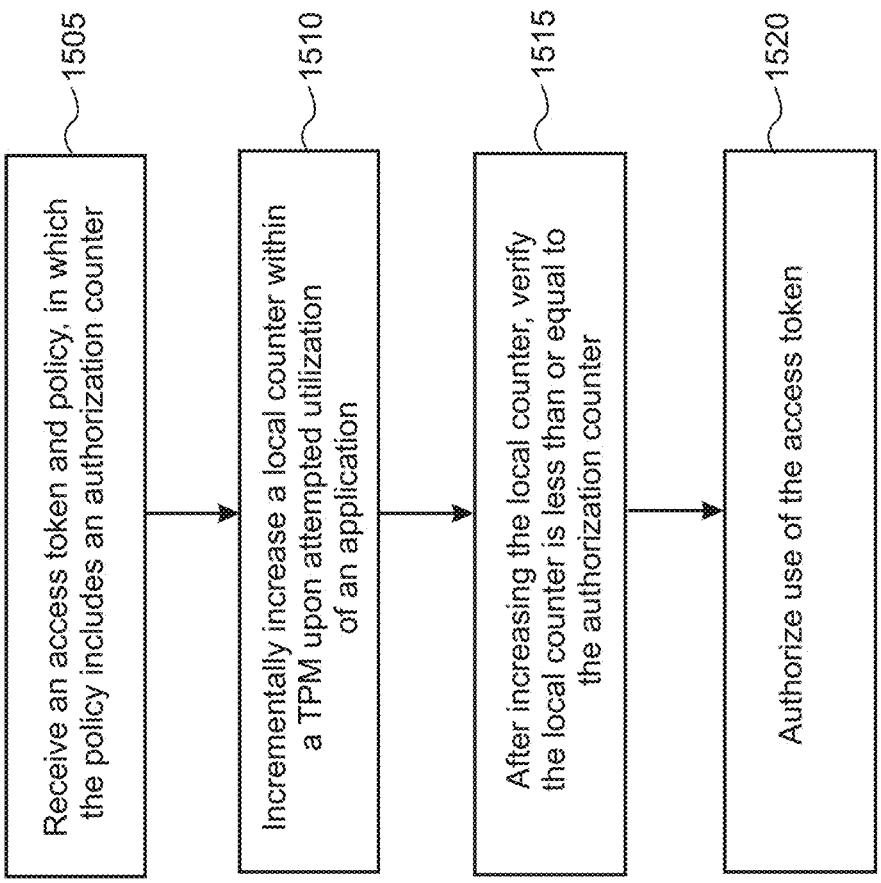
FIGS. 15-17 show illustrative processes performed by the IoT device or the provisioning service.

FIG. 15 is a flowchart of an illustrative method 1500 that may be performed by an IoT device. In step 1505, an access token and policy are received, in which the policy includes an authorization counter. In step 1510, a local counter within a TPM of the IoT device is incrementally increased upon attempted utilization of an application. In step 1515, after increasing the local counter, the local counter is verified as being less than or equal to the authorization counter. In step 1520, use of the access token is authorized.

Figure 16:
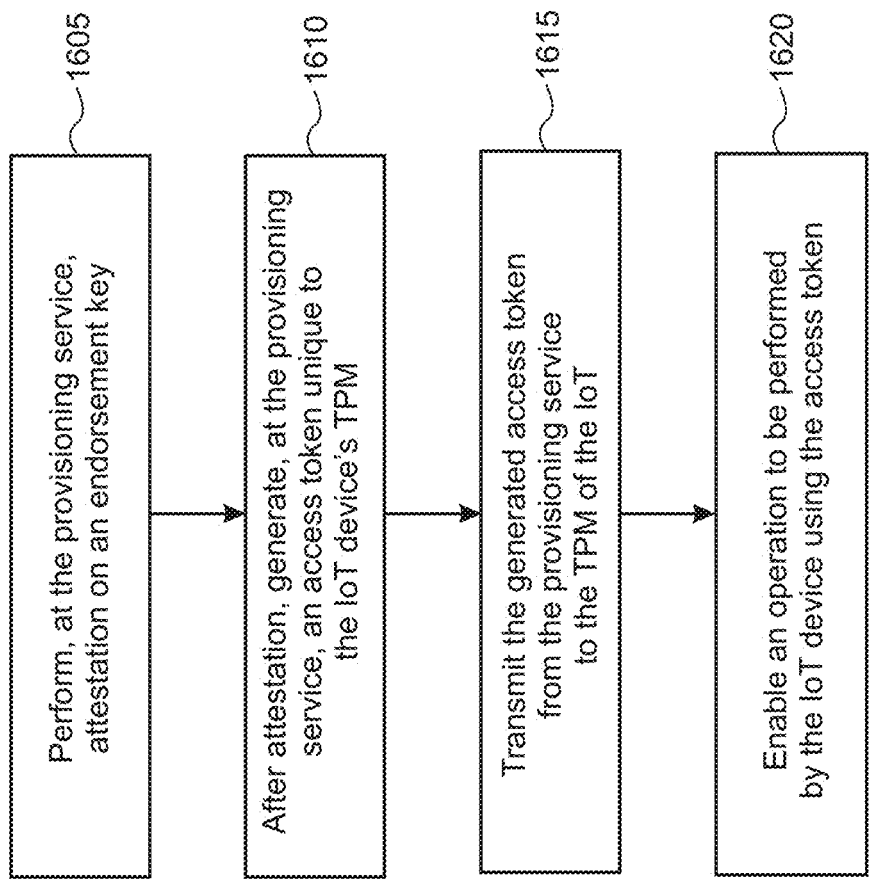

FIG. 16 is a flowchart of an illustrative method 1600 that may be performed by an IoT device and a provisioning service. In step 1605, the provisioning service performs attestation on an endorsement key associated with a TPM of the IoT device. In step 1610, after attestation, the provisioning service generates an access token unique to the IoT device's TPM. In step 1615, the provisioning service transmits the generated access token to the TPM of the IoT. In step 1620, the provisioning service enables an operation to be performed by the IoT device using the access token.

Figure 17:
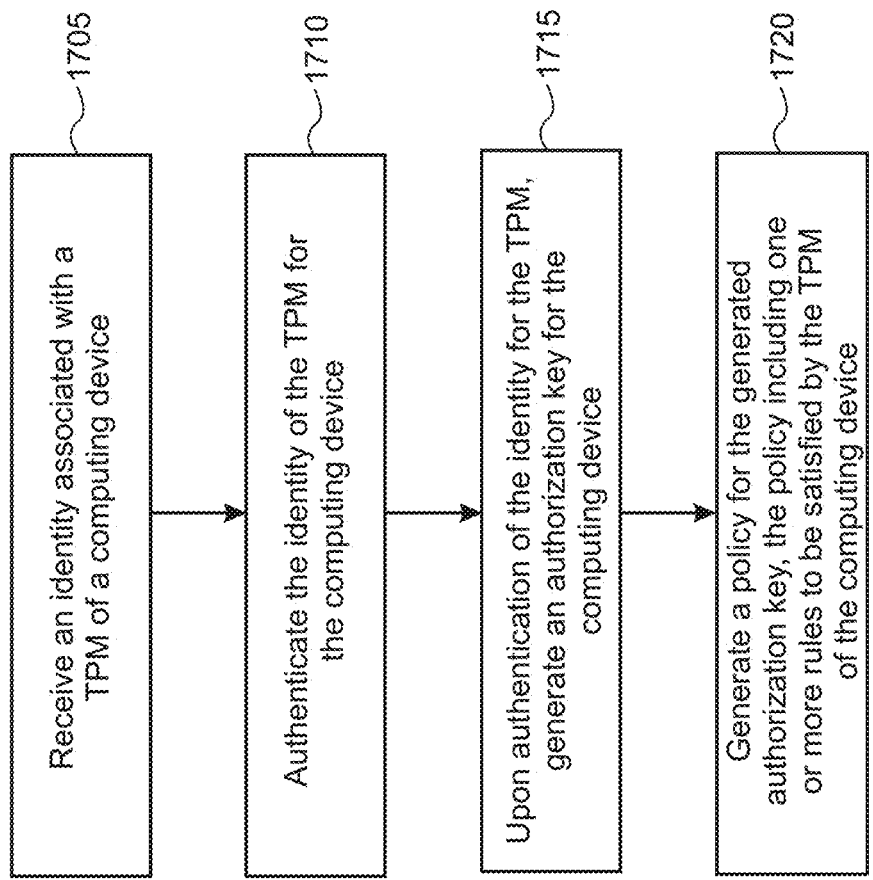

FIG. 17 is a flowchart of an illustrative method 1700 that may be performed by a server operating with a provisioning service. In step 1705, an identity associated with a TPM of a computing device is received. In step 1710, the identity of the TPM of the computing device is authenticated. In step 1715, an authorization key for the TPM of the computing device is generated upon authentication of the identity for the TPM. In step 1720, a policy for the generated authorization key is generated, in which the policy includes one or more rules to be satisfied by the TPM of the computing device.

Figure 18:
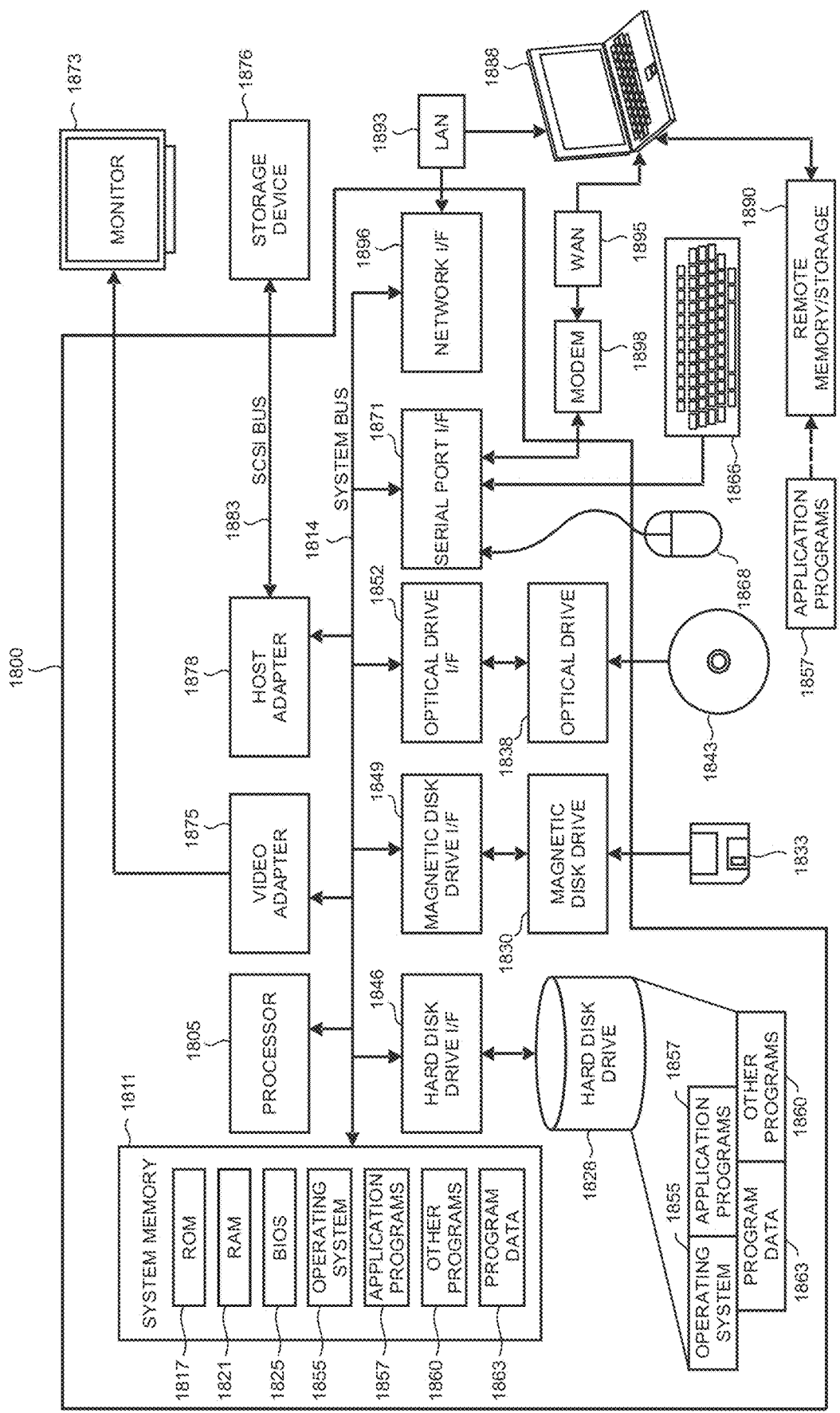
FIG. 18 a simplified block diagram of an illustrative server that may be used in part to implement the use of the trusted platform module (TPM)-based prepaid access token for commercial IoT online services.

FIG. 18 is a simplified block diagram of an illustrative computer system 1800 such as an IoT portal or provisioning service in which the present trusted platform module-based prepaid access token for commercial IoT online services may be implemented. Computer system 1800 includes a processor 1805, a system memory 1811, and a system bus 1814 that couples various system components including the system memory 1811 to the processor 1805. The system bus 1814 may be any of several types of bus structures including a memory bus or memory controller, a peripheral bus, or a local bus using any of a variety of bus architectures. The system memory 1811 includes read only memory (ROM) 1817 and random access memory (RAM) 1821. A basic input/output system (BIOS) 1825, containing the basic routines that help to transfer information between elements within the computer system 1800, such as during startup, is stored in ROM 1817. The computer system 1800 may further include a hard disk drive 1828 for reading from and writing to an internally disposed hard disk (not shown), a magnetic disk drive 1830 for reading from or writing to a removable magnetic disk 1833 (e.g., a floppy disk), and an optical disk drive 1838 for reading from or writing to a removable optical disk 1843 such as a CD (compact disc), DVD (digital versatile disc), or other optical media. The hard disk drive 1828, magnetic disk drive 1830, and optical disk drive 1838 are connected to the system bus 1814 by a hard disk drive interface 1846, a magnetic disk drive interface 1849, and an optical drive interface 1852, respectively. The drives and their associated computer-readable storage media provide non-volatile storage of computer-readable instructions, data structures, program modules, and other data for the computer system 1800. Although this illustrative example includes a hard disk, a removable magnetic disk 1833, and a removable optical disk 1843, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present trusted platform module-based prepaid access token for commercial IoT online services. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are non-transitory and do not include waves, signals, and/or other transitory and/or intangible communication media.

A number of program modules may be stored on the hard disk, magnetic disk, optical disk, ROM 1817, or RAM 1821, including an operating system 1855, one or more application programs 1857, other program modules 1860, and program data 1863. A user may enter commands and information into the computer system 1800 through input devices such as a keyboard 1866 and pointing device 1868 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1805 through a serial port interface 1871 that is coupled to the system bus 1814, but may be connected by other interfaces, such as a parallel port, game port, or universal serial bus (USB). A monitor 1873 or other type of display device is also connected to the system bus 1814 via an interface, such as a video adapter 1875. In addition to the monitor 1873, wearable devices and personal computers can typically include other peripheral output devices (not shown), such as speakers and printers. The illustrative example shown in FIG. 18 also includes a host adapter 1878, a Small Computer System Interface (SCSI) bus 1883, and an external storage device 1876 connected to the SCSI bus 1883.

The computer system 1800 is operable in a networked environment using logical connections to one or more remote computers, such as a remote computer 1888. The remote computer 1888 may be selected as a personal computer, a server, a router, a network PC, a peer device, or other common network node, and typically includes many or all of the elements described above relative to the computer system 1800, although only a single representative remote memory/storage device 1890 is shown in FIG. 18. The logical connections depicted in FIG. 18 include a local area network (LAN) 1893 and a wide area network (WAN) 1895. Such networking environments are often deployed, for example, in offices, enterprise-wide computer networks, intranets, and the Internet.

When used in a LAN networking environment, the computer system 1800 is connected to the local area network 1893 through a network interface or adapter 1896. When used in a WAN networking environment, the computer system 1800 typically includes a broadband modem 1898, network gateway, or other means for establishing communications over the wide area network 1895, such as the Internet. The broadband modem 1898, which may be internal or external, is connected to the system bus 1814 via a serial port interface 1871. In a networked environment, program modules related to the computer system 1800, or portions thereof, may be stored in the remote memory storage device 1890. It is noted that the network connections shown in FIG. 18 are illustrative and other means of establishing a communications link between the computers may be used depending on the specific requirements of an application of the present trusted platform module-based prepaid access token for commercial IoT online services.

Figure 19:
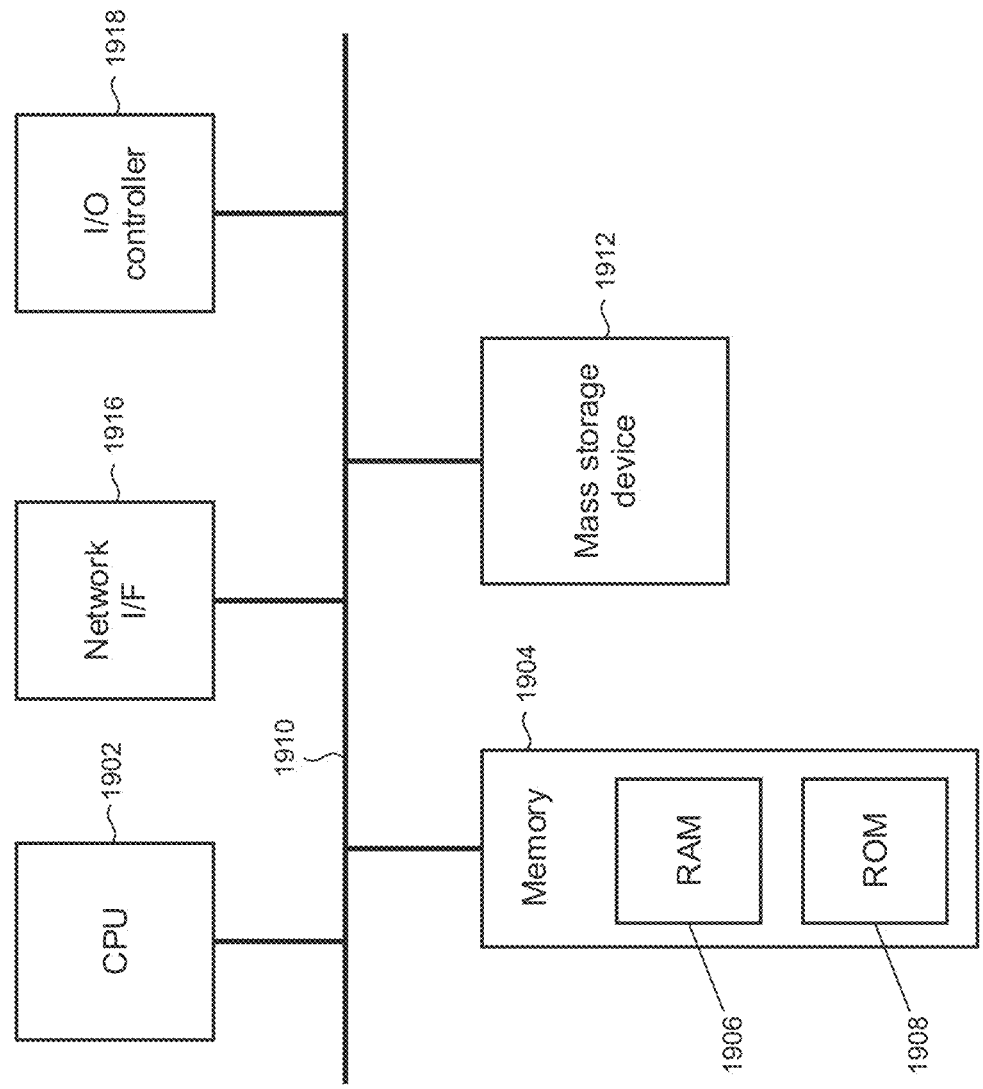
FIG. 19 is a simplified block diagram of an illustrative computing system that may be used in part to implement the use of the TPM-based prepaid access token for commercial IoT online services.

FIG. 19 shows an illustrative architecture 1900 for a device capable of executing the various components described herein for providing the present trusted platform module-based prepaid access token for commercial IoT online services. Thus, the architecture 1900 illustrated in FIG. 19 shows an architecture that may be adapted for an IoT device, wearable device, a server computer, mobile phone, a PDA, a smartphone, a desktop computer, a netbook computer, a tablet computer, GPS device, gaming console, and/or a laptop computer. The architecture 1900 may be utilized to execute any aspect of the components presented herein.

The architecture 1900 illustrated in FIG. 19 includes one or more processors 1902 (e.g., central processing unit, graphic processing units, etc.), a system memory 1904, including RAM (random access memory) 1906 and ROM (read only memory) 1908, and a system bus 1910 that operatively and functionally couples the components in the architecture 1900. A basic input/output system containing the basic routines that help to transfer information between elements within the architecture 1900, such as during startup, is typically stored in the ROM 1908. The architecture 1900 further includes a mass storage device 1912 for storing software code or other computer-executed code that is utilized to implement applications, the file system, and the operating system. The mass storage device 1912 is connected to the processor 1902 through a mass storage controller (not shown) connected to the bus 1910. The mass storage device 1912 and its associated computer-readable storage media provide non-volatile storage for the architecture 1900. Although the description of computer-readable storage media contained herein refers to a mass storage device, such as a hard disk or CD-ROM drive, it may be appreciated by those skilled in the art that computer-readable storage media can be any available storage media that can be accessed by the architecture 1900.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1900.

According to various embodiments, the architecture 1900 may operate in a networked environment using logical connections to remote computers through a network. The architecture 1900 may connect to the network through a network interface unit 1916 connected to the bus 1910. It may be appreciated that the network interface unit 1916 also may be utilized to connect to other types of networks and remote computer systems. The architecture 1900 also may include an input/output controller 1918 for receiving and processing input from a number of other devices, including a keyboard, mouse, touchpad, touchscreen, control devices such as buttons and switches or electronic stylus (not shown in FIG. 19). Similarly, the input/output controller 1918 may provide output to a display screen, user interface, a printer, or other type of output device (also not shown in FIG. 19).

The architecture 1900 may include a voice recognition unit (not shown) to facilitate user interaction with a device supporting the architecture through voice commands, a natural language interface, or through voice interactions with a personal digital assistant (such as the Cortana® personal digital assistant provided by Microsoft Corporation). The architecture 1900 may include a gesture recognition unit (not shown) to facilitate user interaction with a device supporting the architecture through sensed gestures, movements, and/or other sensed inputs.

It may be appreciated that the software components described herein may, when loaded into the processor 1902 and executed, transform the processor 1902 and the overall architecture 1900 from a general-purpose computing system into a special-purpose computing system customized to facilitate the functionality presented herein. The processor 1902 may be constructed from any number of transistors or other discrete circuit elements, which may individually or collectively assume any number of states. More specifically, the processor 1902 may operate as a finite-state machine, in response to executable instructions contained within the software modules disclosed herein. These computer-executable instructions may transform the processor 1902 by specifying how the processor 1902 transitions between states, thereby transforming the transistors or other discrete hardware elements constituting the processor 1902.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1900 in order to store and execute the software components presented herein. It also may be appreciated that the architecture 1900 may include other types of computing devices, including wearable devices, handheld computers, embedded computer systems, smartphones, PDAs, and other types of computing devices known to those skilled in the art. It is also contemplated that the architecture 1900 may not include all of the components shown in FIG. 19, may include other components that are not explicitly shown in FIG. 19, or may utilize an architecture completely different from that shown in FIG. 19.

Figure 20:
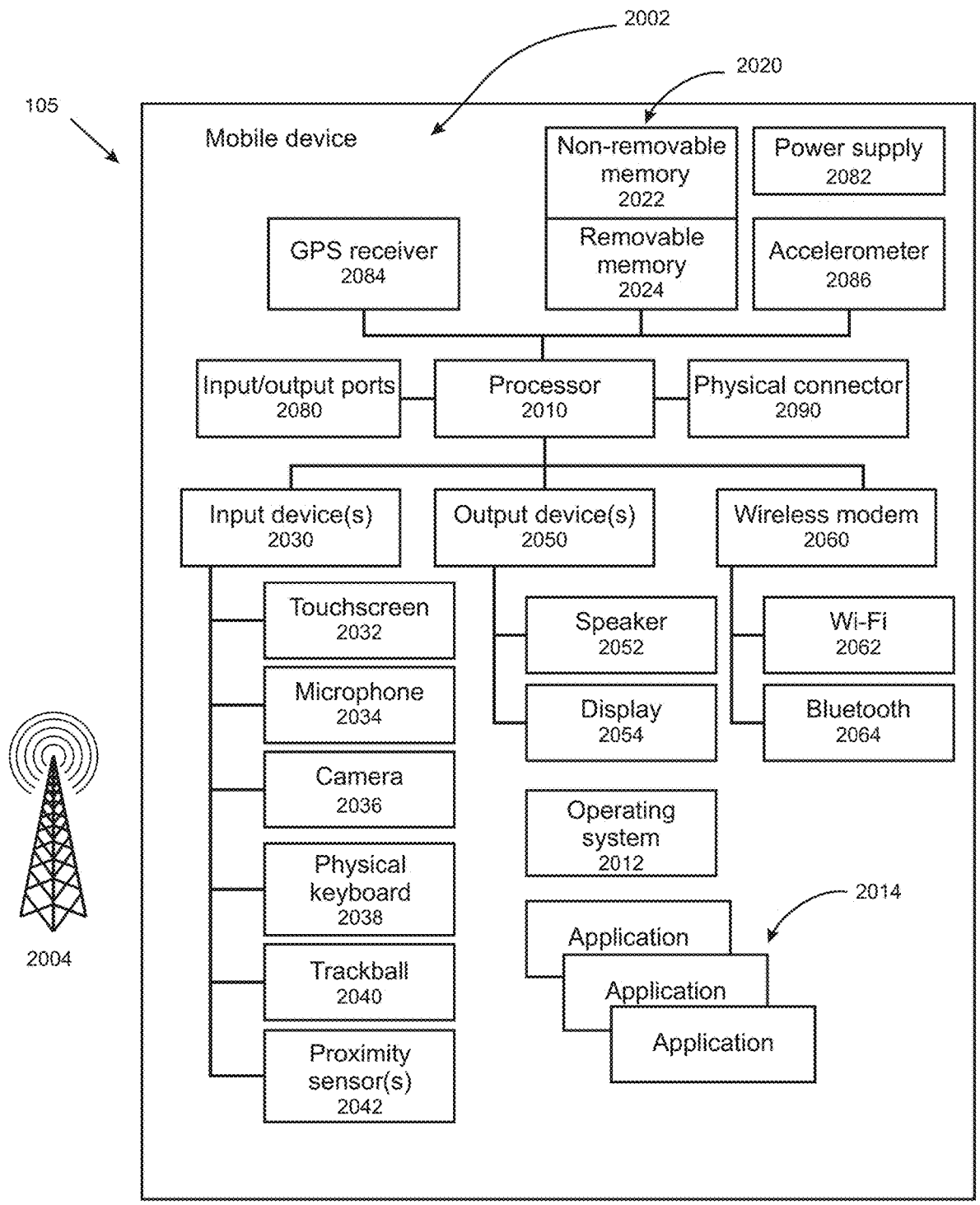
FIG. 20 is a block diagram of an illustrative device such as a mobile phone or smartphone.

FIG. 20 is a functional block diagram of an illustrative device 105 such as a mobile phone or smartphone including a variety of optional hardware and software components, shown generally at 2002. Any component 2002 in the mobile device can communicate with any other component, although, for ease of illustration, not all connections are shown. The mobile device can be any of a variety of computing devices (e.g., cell phone, smartphone, handheld computer, PDA, etc.) and can allow wireless two-way communications with one or more mobile communication networks 2004, such as a cellular or satellite network.

The illustrated device 105 can include a controller or processor 2010 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 2012 can control the allocation and usage of the components 2002, including power states, above-lock states, and below-lock states, and provides support for one or more application programs 2014. The application programs can include common mobile computing applications (e.g., image-capture applications, email applications, calendars, contact managers, web browsers, messaging applications), or any other computing application.

The illustrated device 105 can include memory 2020. Memory 2020 can include non-removable memory 2022 and/or removable memory 2024. The non-removable memory 2022 can include RAM, ROM, Flash memory, a hard disk, or other well-known memory storage technologies. The removable memory 2024 can include Flash memory or a Subscriber Identity Module (SIM) card, which is well known in GSM (Global System for Mobile communications) systems, or other well-known memory storage technologies, such as "smart cards." The memory 2020 can be used for storing data and/or code for running the operating system 2012 and the application programs 2014. Example data can include web pages, text, images, sound files, video data, or other data sets to be sent to and/or received from one or more network servers or other devices via one or more wired or wireless networks.

The memory 2020 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the device 105.

The memory 2020 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The device 105 can support one or more input devices 2030—such as a touchscreen 2032; microphone 2034 for implementation of voice input for voice recognition, voice commands and the like; camera 2036; physical keyboard 2038; trackball 2040; and/or proximity sensor 2042; and one or more output devices 2050—such as a speaker 2052 and one or more displays 2054. Other input devices (not shown) using gesture recognition may also be utilized in some cases. Other possible output devices (not shown) can include piezoelectric or haptic output devices. Some devices can serve more than one input/output function. For example, touchscreen 2032 and display 2054 can be combined into a single input/output device.

A wireless modem 2060 can be coupled to an antenna (not shown) and can support two-way communications between the processor 2010 and external devices, as is well understood in the art. The modem 2060 is shown generically and can include a cellular modem for communicating with the mobile communication network 2004 and/or other radio-based modems (e.g., BLUETOOTH® 2064 or WI-FI 2062). The wireless modem 2060 is typically configured for communication with one or more cellular networks, such as a GSM network for data and voice communications within a single cellular network, between cellular networks, or between the device and a public switched telephone network (PSTN).

The device can further include at least one input/output port 2080, a power supply 2082, a satellite navigation system receiver 2084, such as a GPS receiver, an accelerometer 2086, a gyroscope (not shown), and/or a physical connector 2090, which can be a USB port, IEEE 1394 (FireWire) port, and/or an RS-232 port. The illustrated components 2002 are not required or all-inclusive, as any components can be deleted and other components can be added.

Various exemplary embodiments of the present trusted platform module-based prepaid access token for commercial IoT online services are now presented by way of illustration and not as an exhaustive list of all embodiments. An example includes a method performed by a trusted platform module (TPM) that maintains a local counter and which is disposed in a computing device, comprising: receiving an access token and a policy, in which the policy includes an authorization counter; incrementing a local counter maintained by the TPM upon attempted utilization of an application; after incrementing the local counter, verifying the incremented local counter is less than or equal to the authorization counter; and after verification that the local counter is less than or equal to the authorization counter, authorizing use of the access token.

In another example, the computing device is an Internet of Things (IoT) device. In another example, the local counter is a monotonic counter. In another example, authorization to use the access token depends on satisfaction of each element in the policy by the TPM. In another example, elements of the policy to be satisfied are instructions to increment the local counter upon each execution of the policy and the incremented local counter is less than or equal to the authorization counter. In another example, authorizing use of the access token includes signing an authorization token with the access token. In another example, the method further comprises using the application or accessing a remote service using the signed authorization token.

A further example includes an access system configured for use with an Internet of Things (IoT) device and a provisioning service operating on a remote server, comprising: performing, at the provisioning service, attestation on an endorsement key associated with a trusted platform module (TPM) on the IoT device, in which attestation at least verifies the IoT device's authorization to receive an access token; after attestation, generating, at the provisioning service, the access token unique to the TPM of the IoT; transmitting the generated access token from the provisioning service to the TPM of the IoT; and enabling an operation to be performed by the IoT device using the access token.

In another example, the access token is uniquely associated with the endorsement key for the TPM. In another example, the access system further comprises: prior to attestation of the IoT device, receiving, from the IoT device by the provisioning service, the endorsement key and a current state of a monotonic counter associated with the TPM for use during attestation by the provisioning service. In another example, the access system further comprises: assigning, at the provisioning service, a limited number of uses for the access token by the IoT device. In another example, after the limited number of uses for the access token is depleted, the access system further comprises: receiving, from the IoT device by the provisioning service, a request for additional uses for the access token; and responsive to the received request, increasing, at the provisioning service, the limited number of uses for the access token, in which the increased limited number of uses is determined based on a current count on a monotonic counter at the IoT device. In another example, the received request includes a purchase for the additional limited number of uses for the access token. In another example, the limited number of uses is written into a policy that is associated with the access token, and usage of the access token is contingent upon successful execution of the policy. In another example, the enabled operation includes one or more of communicating with a remote portal or executing an application.

A further example includes one or more non-transitory hardware-based computer-readable memory devices storing instructions which, when executed by one or more processors disposed in a remote server configured for operations as an authentication service, cause the remote server to: receive an identity associated with a trusted platform module (TPM) disposed in a computing device; attempt to authenticate the identity of the TPM in the computing device; upon successful authentication of the TPM identity, generate an authorization key usable in operations implemented by the TPM in the computing device; and create a policy for the generated authorization key, the policy including one or more rules to be satisfied by operations of the TPM in the computing device.

In another example, the authorization key is unique to the identity associated with the TPM. In another example, the one or more rules for the policy include: incrementing a counter each time the policy is used; and limiting a number of times the TPM uses the authorization key according to a pre-set counter. In another example, the instructions further cause the remote server to: receive a request to at least increase a number of times in which the computing device is permitted to use the authorization key; and when the received request is authorized by the remote server, modify the policy to reflect a new pre-set counter. In another example, modification of the policy includes changing portions of a script contained in the policy.

The subject matter described above is provided by way of illustration only and is not to be construed as limiting. Various modifications and changes may be made to the subject matter described herein without following the example embodiments and applications illustrated and described, and without departing from the true spirit and scope of the present invention, which is set forth in the following claims.

What is claimed:

1. A method performed by a trusted platform module (TPM) disposed in a computing device, comprising:
   providing an endorsement key that is unique to the computing device as a first trusted object in the TPM;
   implementing a trusted local counter as a second trusted object in the TPM;
   operating the TPM to enforce authorization for the computing device to access an application through an Internet-of-Things (IoT) portal in response to an access request made by the computing device to a provisioning service, in which the IoT portal is operated on a first server that is remotely located from the computing device and the provisioning service is operated on a second server that is remotely located from the computing device;
   receiving an access token that is unique to the TPM and an associated policy that are generated by the provisioning service for controlling instances of usage of the application through the IoT portal by the computing device responsively to the access request, in which the access token is generated by the provisioning service using the unique endorsement key and a count indicating a current state of the trusted local counter, the unique endorsement key and count being sent with the access request, and in which the policy includes an authorization counter and one or more rules to be satisfied by the TPM in enforcing the authorization for access to the application, and in which the access token and policy are received in response to the provisioning service successfully verifying an identity of the TPM using the unique endorsement key;
   incrementing the trusted local counter in the TPM upon each instance of usage of the application;
   after incrementing the trusted local counter in the TPM, verifying the incremented local counter is less than or equal to the authorization counter that is specified in the policy; and
   after verification that the trusted local counter is less than or equal to the authorization counter, authorizing use of the access token by the TPM to enforce access and utilization of the application by the computing device through the IoT portal according to the one or more rules included in the policy.

2. The method of claim 1, in which the computing device is an IoT device.

3. The method of claim 1, in which the trusted local counter is a monotonic counter.

4. The method of claim 1, in which authorizing use of the access token includes signing an authorization token with the access token.

5. The method of claim 4, further comprising using the application or accessing a remote service using the signed authorization token.

6. The method of claim 1, in which the access token is uniquely associated with the endorsement key for the TPM.

7. The method of claim 2,
   in which attestation of the IoT device is performed by the provisioning service, and in which, prior to attestation of the IoT device, the endorsement key and a current state of the trusted local counter are transmitted to the provisioning service by the IoT device.

8. The method of claim 2,
   in which a limited number of uses for the access token by the IoT device is assigned at the provisioning service.

9. The method of claim 8, in which after the limited number of uses for the access token is depleted, further comprising:
   sending, by the IoT device to the provisioning service, a request for additional uses for the access token,
   wherein, responsive to the request the provisioning service increases the limited number of uses for the access token, in which the increased limited number of uses is determined based on a current count of the trusted local counter reaching a limit set by the authorization counter.

10. The method of claim 9, in which the request includes a purchase for the additional limited number of uses for the access token.

11. The method of claim 8, in which the limited number of uses is written into the policy associated with the access token, and usage of the access token is contingent upon successful execution of the policy.

12. The method of claim 1, in which an operation is enabled on the computing device using the access token, the enabled operation including one or more of communicating with a remote portal or executing an application.

13. One or more non-transitory hardware-based computer-readable memory devices storing instructions which, when executed by one or more processors disposed in a computing device having a trusted platform module (TPM), cause the computing device to:
   provide an endorsement key that is unique to the computing device as a first trusted object in the TPM;
   implement a trusted local counter as a second trusted object in the TPM;
   operate the TPM to enforce authorization for the computing device to access an application through an Internet-of-Things (loT) portal in response to an access request made by the computing device to a provisioning service, in which the IoT portal is operated on a first server that is remotely located from the computing device and the provisioning service is operated on a second server that is remotely located from the computing device;
   receive an access token that is unique to the TPM and an associated policy that are generated by the provisioning service for controlling instances of usage of the application through the IoT portal by the computing device responsively to the access request, in which the access token is generated by the provisioning service using the unique endorsement key and a count indicating a current state of the trusted local counter, the unique endorsement key and count being sent with the access request, and in which the policy includes an authorization counter and one or more rules to be satisfied by the TPM in enforcing the authorization for access to the application, and in which the access token and policy are received in response to the provisioning service successfully verifying an identity of the TPM using the unique endorsement key;

increment the trusted local counter in the TPM upon each instance of usage of the application;

after incrementing the trusted local counter in the TPM, verify the incremented local counter is less than or equal to the authorization counter that is specified in the policy; and after verification that the trusted local counter is less than or equal to the authorization counter, authorize use of the access token by the TPM to enforce access and utilization of the application by the computing device through the IoT portal according to the one or more rules included in the policy.

14. The one or more non-transitory hardware-based computer-readable memory devices of claim 13, in which the one or more rules for the policy include:

incrementing the trusted local counter each time the policy is used; and limiting a number of times the TPM uses the access token according to the authorization counter that is included in the policy.

15. The one or more non-transitory hardware-based computer-readable memory devices of claim 14, in which the instructions further cause the computing device to:

send a request to at least increase a number of times in which the computing device is permitted to use the access token, in which, responsive to the request, the policy is modified by the provisioning service to reflect a new value for the authorization counter.

16. The one or more non-transitory hardware-based computer-readable memory devices of claim 15, in which the modification of the policy includes changing portions of a script contained in the policy.

17. A computing device, comprising:

one or more processors;

a trusted platform module (TPM); and one or more non-transitory hardware-based computer-readable memory devices storing instructions which, when executed by the one or more processors, cause the computing device to:

provide an endorsement key that is unique to the computing device as a first trusted object in the TPM;

implement a trusted local counter as a second trusted object in the TPM;

operate the TPM to enforce authorization for the computing device to access an application through an Internet-of-Things (IoT) portal in response to an access request made by the computing device to a provisioning service, in which the IoT portal is operated on a first server that is remotely located from the computing device and the provisioning service is operated on a second server that is remotely located from the computing device;

receive an access token that is unique to the TPM and an associated policy that are generated by the provisioning service for controlling instances of usage of the application through the IoT portal by the computing device responsively to the access request, in which the access token is generated by the provisioning service using the unique endorsement key and a count indicating a current state of the trusted local counter, the unique endorsement key and count being sent with the access request, and in which the policy includes an authorization counter and one or more rules to be satisfied by the TPM in enforcing the authorization for access to the application, and in which the access token and policy are received in response to the provisioning service successfully verifying an identity of the TPM using the unique endorsement key;

increment the trusted local counter in the TPM upon each instance of usage of the application;

after incrementing the trusted local counter in the TPM, verify the incremented local counter is less than or equal to the authorization counter that is specified in the policy; and after verification that the trusted local counter is less than or equal to the authorization counter, authorize use of the access token by the TPM to enforce access and utilization of the application by the computing device through the IoT portal according to the one or more rules included in the policy.

18. The computing device of claim 17 in which the provisioning service is adapted to perform authentication of the computing device.

19. The computing device of claim 18 in which the authentication is based on verification of TPM identity using the endorsement key.

20. The computing device of claim 17 in which the access token and the associated policy are received based on successful authentication of the computing device.

* * * * *